United States Patent
Chua et al.

(10) Patent No.: US 6,920,001 B2
(45) Date of Patent: Jul. 19, 2005

(54) THERMAL ASPERITY MULTI-THRESHOLD ALGORITHM USING THE READ/WRITE CHANNEL

(75) Inventors: Teng Hou Sebastian Chua, Singapore (SG); Myint Ngwe, Singapore (SG); Lan Xia, Singapore (SG); Beng Wee Quak, Singapore (SG); Quek Leong Choo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 216 days.

(21) Appl. No.: 10/459,735

(22) Filed: Jun. 12, 2003

(65) Prior Publication Data

US 2004/0252392 A1 Dec. 16, 2004

(51) Int. Cl.[7] .................................................. G11B 5/02
(52) U.S. Cl. .......................................... 360/25; 73/105
(58) Field of Search ............................. 360/25, 31, 53, 360/46; 73/105

(56) References Cited

U.S. PATENT DOCUMENTS

| | | | |
|---|---|---|---|
| 5,666,237 A | 9/1997 | Lewis | 360/75 |
| 6,038,091 A | 3/2000 | Reed et al. | 360/46 |
| 6,049,763 A * | 4/2000 | Christiansen et al. | 702/133 |
| 6,175,457 B1 | 1/2001 | Flynn | 360/46 |
| 6,494,085 B2 * | 12/2002 | Wakefield et al. | 73/105 |
| 6,504,662 B2 * | 1/2003 | Sobey | 360/25 |

* cited by examiner

Primary Examiner—David Hudspeth
Assistant Examiner—Dan I Davidson
(74) Attorney, Agent, or Firm—Kirk A. Cesari

(57) ABSTRACT

A method of categorizing magnitudes of thermal asperities in a read-back signal of a data storage system includes receiving the read-back signal from a location containing a thermal asperity. A peak magnitude signal is generated from the read-back signal. A threshold signal is generated using a variable threshold generator. The peak magnitude signal is compared to the threshold signal and a magnitude of the thermal asperity is categorized as a function of the comparison.

17 Claims, 8 Drawing Sheets

THERMAL ASPERITY MULTI-THRESHOLD ALGORITHM USING THE READ/WRITE CHANNEL

FIELD OF THE INVENTION

The present invention relates generally to data storage systems, and more particularly but not by limitation to methods and apparatus for categorizing magnitudes of thermal asperities in data storage systems.

BACKGROUND OF THE INVENTION

Magnetoresistive (MR) heads are employed in magnetic data storage systems, such as magnetic disc drives, to read data from the storage media. While the MR head is flying over the surface of the magnetic storage media to provide a read-back signal that corresponds to data written on the storage media, it sometimes hits a defect known as an asperity. MR heads exhibit a change in resistance in the presence of a changing magnetic field. This resistance change is transformed into a voltage signal by passing a constant current through the MR element of the head. The direct current (DC) value of the voltage, for a given head, is the product of the constant bias current and the total resistance between the head's lead terminals.

The mechanical collision between the MR head and a defect or asperity can locally increase the temperature of the MR element by more than 100° C. This event has been termed a "thermal asperity". Since the change in resistance of the MR element, as a function of the magnetic field due to the data stored on the media, is less than 1% of the total MR element or strip resistance, the signal step that is added to the read-back signal when a thermal asperity is encountered can be greater than twice the base-to-peak read signal. For example, an increase in the temperature of the MR element of 100° C. would typically cause a resistance change and a voltage change of approximately 2%. When the protrusion on the disc is persistent, and thus the MR head continues to strike it with each revolution, then the data that is being modulated by the resultant thermally induced signal transient will be unreadable without a sufficient error correction code. Methods and apparatus for categorizing the magnitudes of thermal asperities, and thus the size of the defect on the media surface, would be a significant improvement in the art.

Embodiments of the present invention offer advantages which can be useful in categorizing magnitudes of thermal asperities in data storage systems.

SUMMARY OF THE INVENTION

A method of categorizing magnitudes of thermal asperities in a read-back signal of a data storage system includes receiving the read-back signal from a location containing a thermal asperity. A peak magnitude signal is generated from the read-back signal. A threshold signal is generated using a variable threshold generator. The peak magnitude signal is compared to the threshold signal and a magnitude of the thermal asperity is categorized as a function of the comparison.

In some embodiments, generating the threshold signal comprises initially setting the threshold signal to a minimum threshold signal value, and comparing the peak magnitude signal to the threshold signal further comprises determining whether the thermal asperity was detected, with the threshold signal set to the minimum threshold signal value, as a function of the comparison. In still more specific embodiments, if it is determined that the thermal asperity was detected with the threshold signal set to the minimum threshold signal value, then the method further comprises increasing the threshold signal to a next threshold signal value. Then, it is determined whether the thermal asperity was detected with the threshold signal set to the next threshold value.

In some embodiments, determining whether the thermal asperity was detected with the threshold signal set to the next threshold value further comprises re-reading at the thermal asperity location to obtain a new read-back signal containing the thermal asperity, and generating a peak magnitude signal from the new read-back signal. The threshold signal is generated at the next threshold value using the variable threshold generator, and the peak magnitude signal is again compared to the threshold signal. A determination is made, as to whether the thermal asperity was detected with the threshold signal set to the next threshold value, as a function of the comparison. If a thermal asperity was detected, these steps can be repeated with increasing threshold signal values until it is determined that the thermal asperity was not detected. The magnitude of the thermal asperity is then categorized as a function of the current threshold value of the threshold signal.

Also disclosed are data storage systems, and circuits contained therein, configured to implement the methods.

Other features and benefits that characterize embodiments of the present invention will be apparent upon reading the following detailed description and review of the associated drawings.

BRIEF DESCRIPTION OF THE DRAWINGS

FIGS. 6-1 through 6-3 are flow diagrams illustrating more specific steps of the method shown in FIG. 4 in accordance with some embodiments of the present invention.

DETAILED DESCRIPTION OF ILLUSTRATIVE EMBODIMENTS

The present invention includes methods and apparatus for sequentially detecting thermal asperities using a multi-threshold algorithm and technique to screen out data storage systems with large media defects. The multi-threshold detection algorithm and apparatus allows thermal asperities to be categorized according to their impact strength, and thus allows data storage systems with large media defects to be identified. Data storage systems found to have defects above a critical size are failed. This reduces the chance of damage to MR heads from persistent contact with defects, thus leading to head instability.

Figure 1:
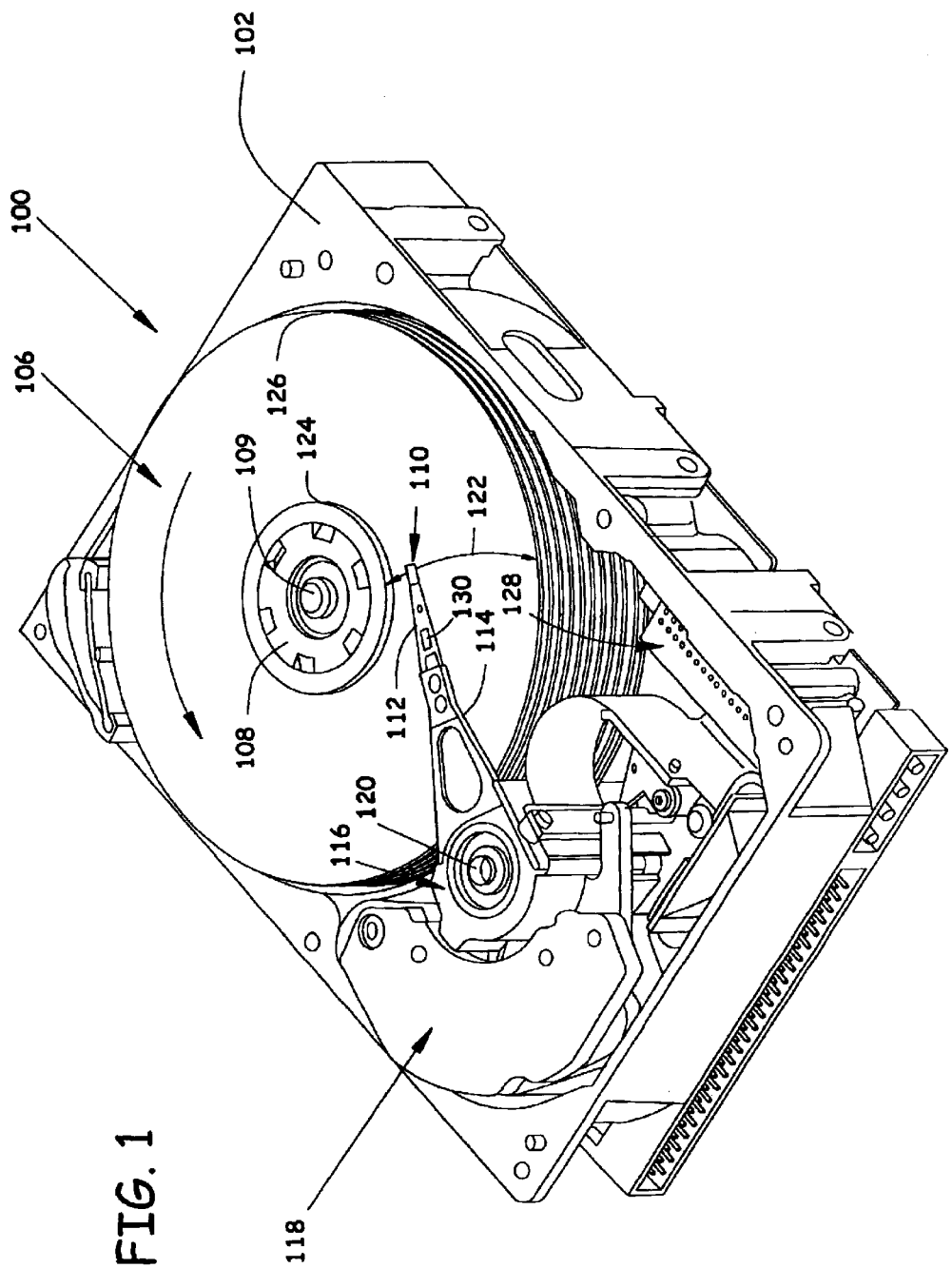
FIG. 1 is an isometric view of a disc drive type data storage system.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109.

Each disc surface has an associated disc head slider 110 which is mounted to disc drive 100 for communication with the disc surface. Sliders 110 include MR heads for reading data from the disc surface. In the example shown in FIG. 1, MR head sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics (diagrammatically included within electronics 128) based on signals generated by heads 110 and a host computer (not shown). A micro-actuator 130, which provides fine position control of heads 110, is used in combination with VCM 118 that provides relatively coarse positioning of heads 110.

While disc drive 100 is shown in FIG. 1 for illustrative purposes, the present invention is not limited to use with disc drive data storage systems. Instead, the present invention applies to data storage systems which utilize a MR head which can come into contact with a media defect, thus causing a thermal asperity and potentially damaging the head and/or media.

Figure 2:
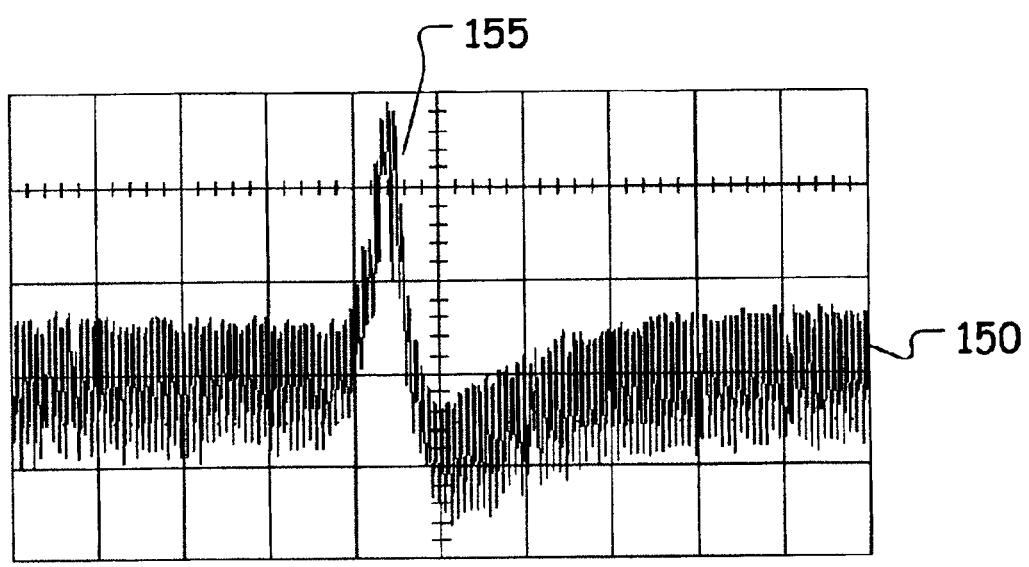
FIG. 2 is a plot of a read-back signal illustrating a thermal asperity event.

Referring now to FIG. 2, shown is a plot of a read-back signal 150 from the MR head of head slide 110 shown in FIG. 1. Included in the read-back signal 150 is a thermal asperity event 155 caused by an increase in temperature of the MR element of the head. As used herein, the phrase "thermal asperity" is indicative of both the heating of the MR element or stripe of the head, and of the resulting signal step (shown at 155) in the read-back signal which occurs as a result of that increase in temperature. As can be seen in FIG. 2, the amplitude of step 155 is significantly greater than the baseline of read-back signal 150, which will result in potential errors when processing the read-back signal. Also, the impact between the MR head and the asperity on the media surface can damage the head or the media, particularly if the contact is frequent and repeated as would be the case with larger asperities. The magnitude or amplitude of thermal asperity event 155 relative to the baseline amplitude of read-back signal 150 is indicative of the magnitude or size of the asperity on the media surface.

During manufacturing, defect scanning processes are used to detect thermal asperities using a threshold detector within the read/write channel. These thermal asperities are eliminated from customer use by either rejecting devices in which the thermal asperities are detected, or by marking such media areas for non-use during data processing. Frequently, an approach has been to screen these imperfections early in the data storage system certification process in order to prevent data storage systems with too many particles or bumps from being given to the end-user. Systems that do not fail the criteria have their respective thermal asperities areas mapped. However, it is often the case that such media imperfections are already inherent during the data storage system manufacturing process. Whenever the MR element or sensor of the head contacts a particle or bump (asperity), there is a high risk that some damage is inflicted on the MR element. The amount of risk and damage is relative to the size of the asperity, with the risk and amount of damage increasing with increases in defect sizes. Thus, "sizing" or "categorizing" of thermal asperities is important. The methods and apparatus of the present invention are useful in sizing these asperities by categorizing the magnitudes of their corresponding thermal asperities in the read/back signal.

Figure 3:
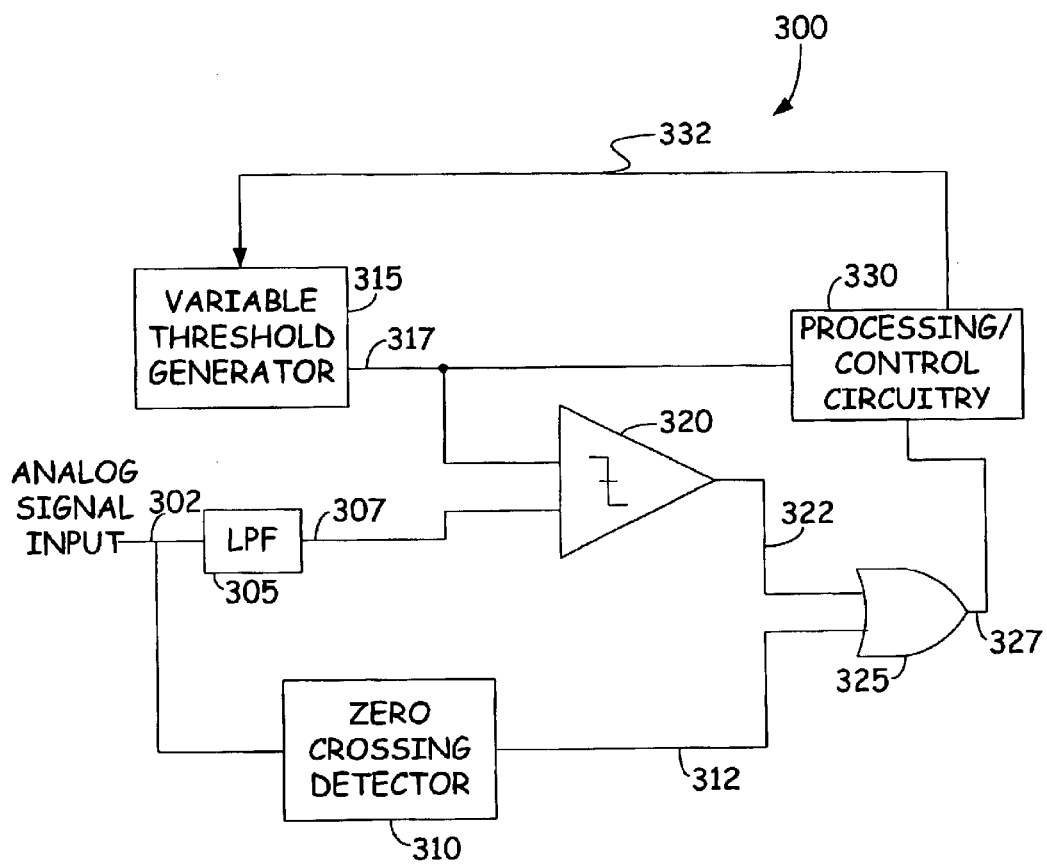
FIG. 3 is a block diagram illustrating a thermal asperity detection and categorization circuit in accordance with embodiments of the present invention.

Referring now to FIG. 3, shown is a thermal asperity detection circuit 300 which can be used in accordance with the present invention to categorize magnitudes of thermal asperities in a read-back signal. Circuit 300 can be implemented within the read/write channel of a disc drive or other data storage system. Circuit 300 includes a low pass filter (or other peak detector) 305, a zero crossing detector 310, a variable threshold generator 315, a comparator 320, an OR gate 325 and processing/control circuitry 330.

Analog signal input 302 is a read-back signal, such as signal 150 shown in FIG. 2, within the channel. Detection is accomplished by sensing the baseline of the read-back signal using both a low-pass filter (or other peak detectors) 305 and a zero-crossing detector 310. The low-pass filter or other peak detector 305 effectively mathematically integrates the area under the curve formed by the read-back signal. Thus, output 307 is indicative of the baseline amplitude of the read-back signal, and of thermal asperity should one be present. Variable threshold generator 315 generates a threshold signal 317 which is provided, along with signal 307, to comparator 320. Variable threshold generator 315 is, in some embodiments, controlled by processing/control circuitry 330 to change the amplitude or magnitude of the threshold signal 317 provided to the comparator in order to size or categorize the thermal asperity. A more detailed discussion of a method of categorizing thermal asperities is provides below with reference to FIGS. 5 and 6-1 through 6-3.

Output 322 of comparator 320 will change (for example to a high logic state) when the amplitude of signal 307 surpasses the amplitude of variable threshold signal 317. Changing output 322 to a high logic state causes OR gate 325 to change its output 327 to a high logic state as well. This provides a timing signal to processing circuitry 330. Upon processing circuitry 330 receiving a high logic states signal at output 327, processing circuitry 330 identifies the thermal asperity has having a magnitude or amplitude of at least the current value of the variable threshold provided at output 317 of generator 315. The methods disclosed herein can be implemented, at least in part, in processing circuitry 330 or in other available processing resources. Circuit 300 shown in FIG. 3 constitutes a multi-threshold loop for use in thermal asperity categorization during early or preliminary development stages. Operation of the multi-threshold loop is described below in greater detail with reference to FIGS. 6-1 and 6-2.

Figure 4:
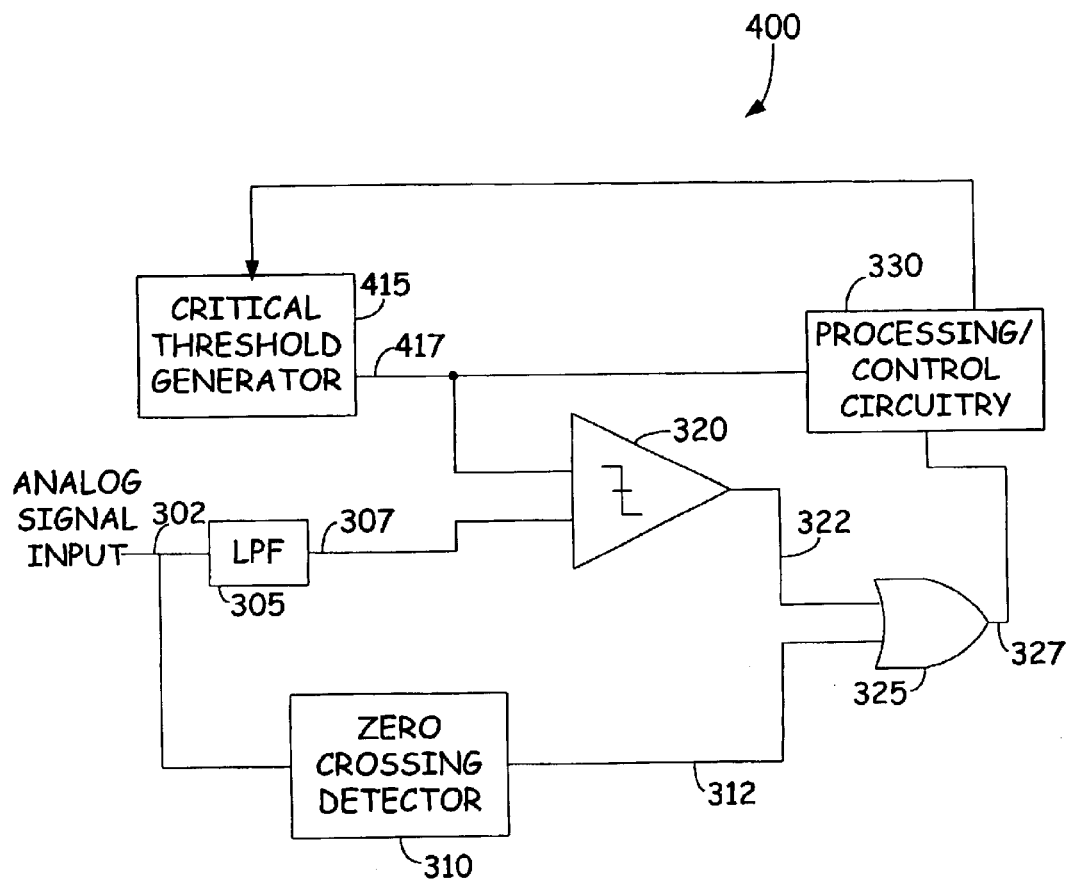
FIG. 4 is a block diagram illustrating a thermal asperity detection and categorization circuit in accordance with embodiments of the present invention.

FIG. 4 is a block diagram illustrating circuit 400 which constitutes a single-threshold loop which is utilized in a middle phase of development after categorization using the multi-threshold loop. Circuit 400 forming the single-threshold loop differs from circuit 300 only or primarily in the inclusion of a critical threshold generator 415 instead of a variable threshold generator 315. Critical threshold generator 415 generates at output 417 a critical threshold which is used to fail data storage systems having defects or asperities which cause thermal asperities larger than the critical threshold. It must be noted that, since critical threshold generator 415 generates a threshold similar to variable threshold generator 315, circuits 300 and 400 can be combined, with variable threshold generator 315 being controlled to generate only a critical threshold during single-threshold loop method steps. Operation of the single-threshold loop is described below in greater detail with reference to FIGS. 6-1 and 6-3.

Figure 5:
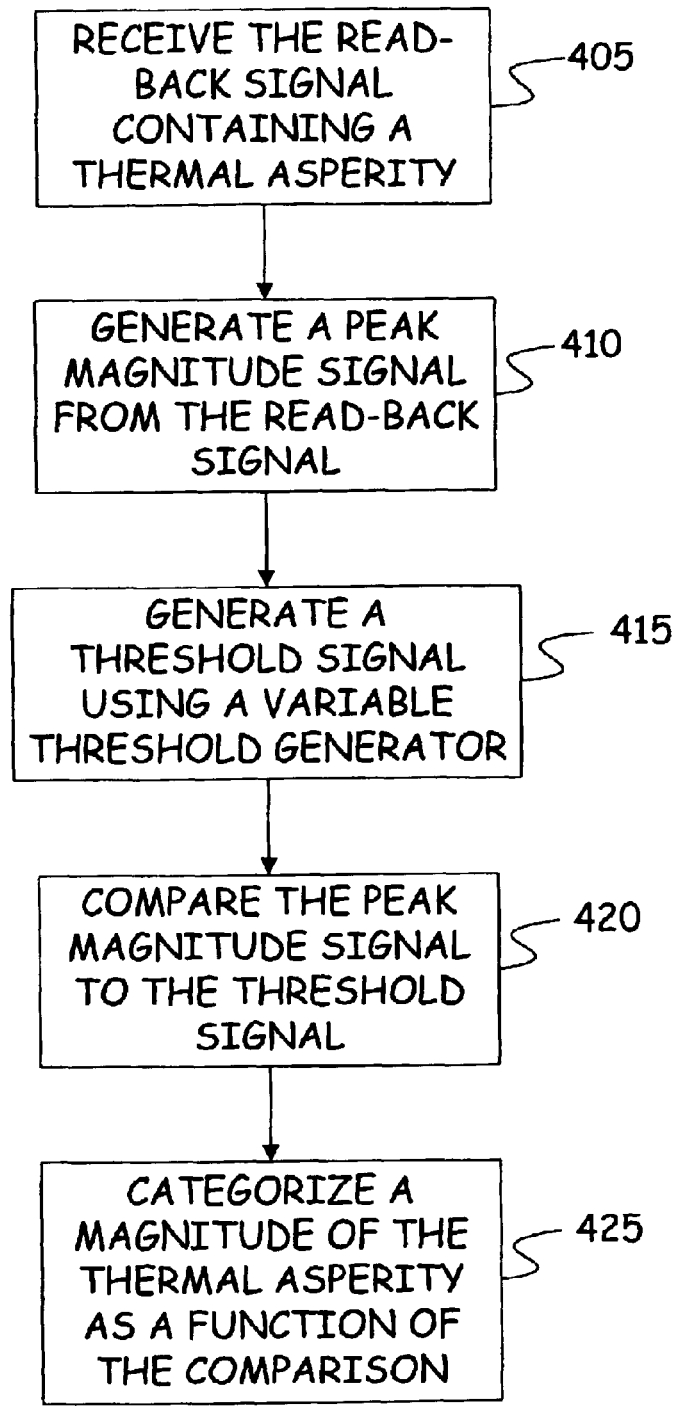
FIG. 5 is flow diagram illustrating a method of categorizing magnitudes of thermal asperities in a read-back signal in accordance with embodiments of the present invention.

Referring now to FIG. 5, shown is a method of categorizing thermal asperities in a read-back signal in accordance with embodiments of the present invention. As shown at block 405 of the method diagram, a read-back signal containing a thermal asperity is received. A peak magnitude signal is generated from or as a function of the read-back signal such that the peak magnitude signal is reflective of a magnitude of the thermal asperity. Considering the circuit shown in FIG. 3, the peak magnitude signal can be output 307 of the low pass filter 305.

Next, as illustrated at block 415, a threshold signal is generated using a variable threshold generator. As discussed above, the variable threshold generator generates a threshold signal having an amplitude or magnitude which is selected by a controller. The size of the increments between the various threshold signal magnitudes is a design choice dependent in part upon how precise the thermal asperity categorization process is desired to be.

Next, as illustrated at block 420, the peak magnitude signal is compared to the threshold signal. Based upon the comparison results, a magnitude of the thermal asperity is categorized. This is illustrated at block 425.

Figures 1, 6:
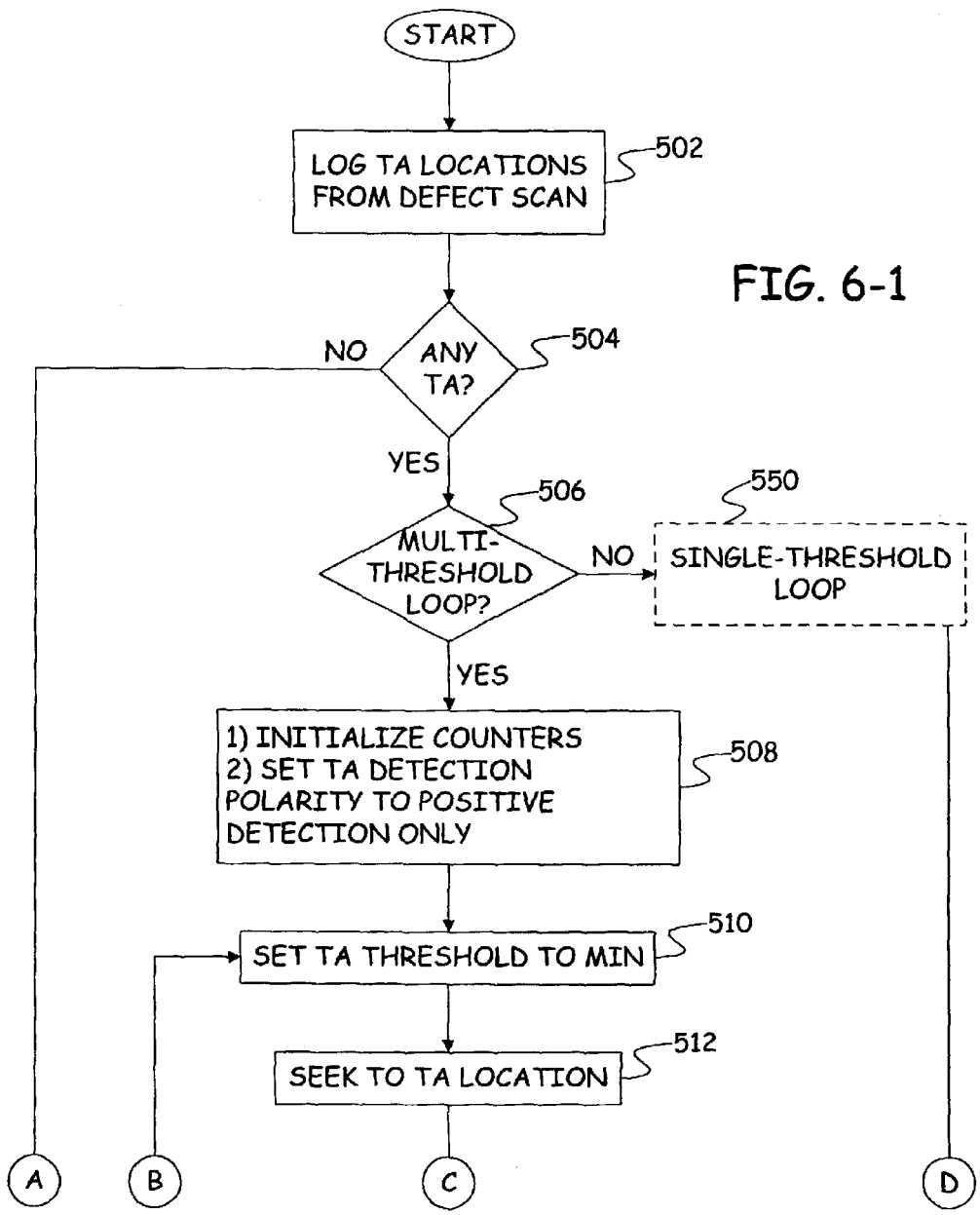
Figures 2, 6:
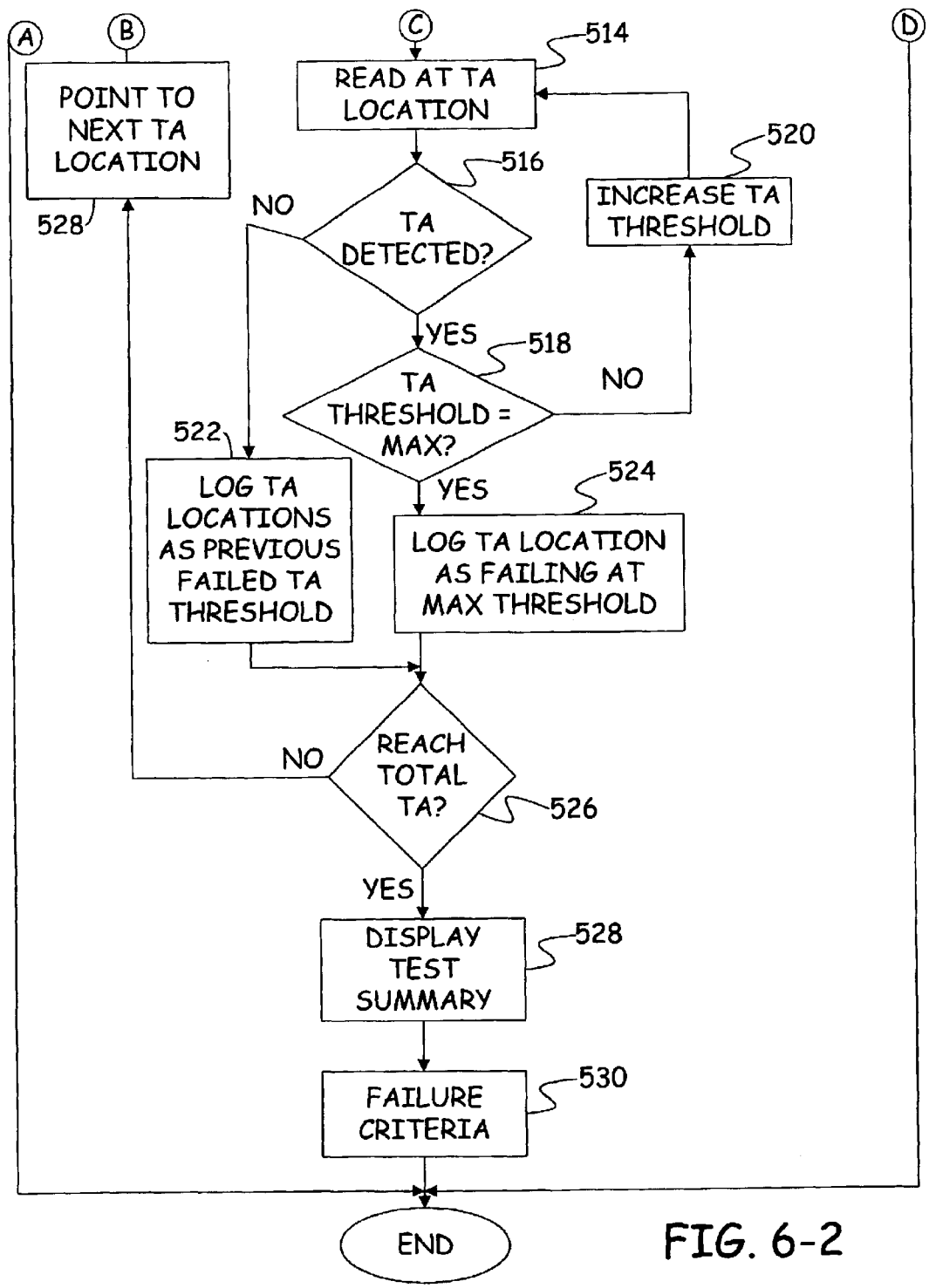
Figures 3, 6:
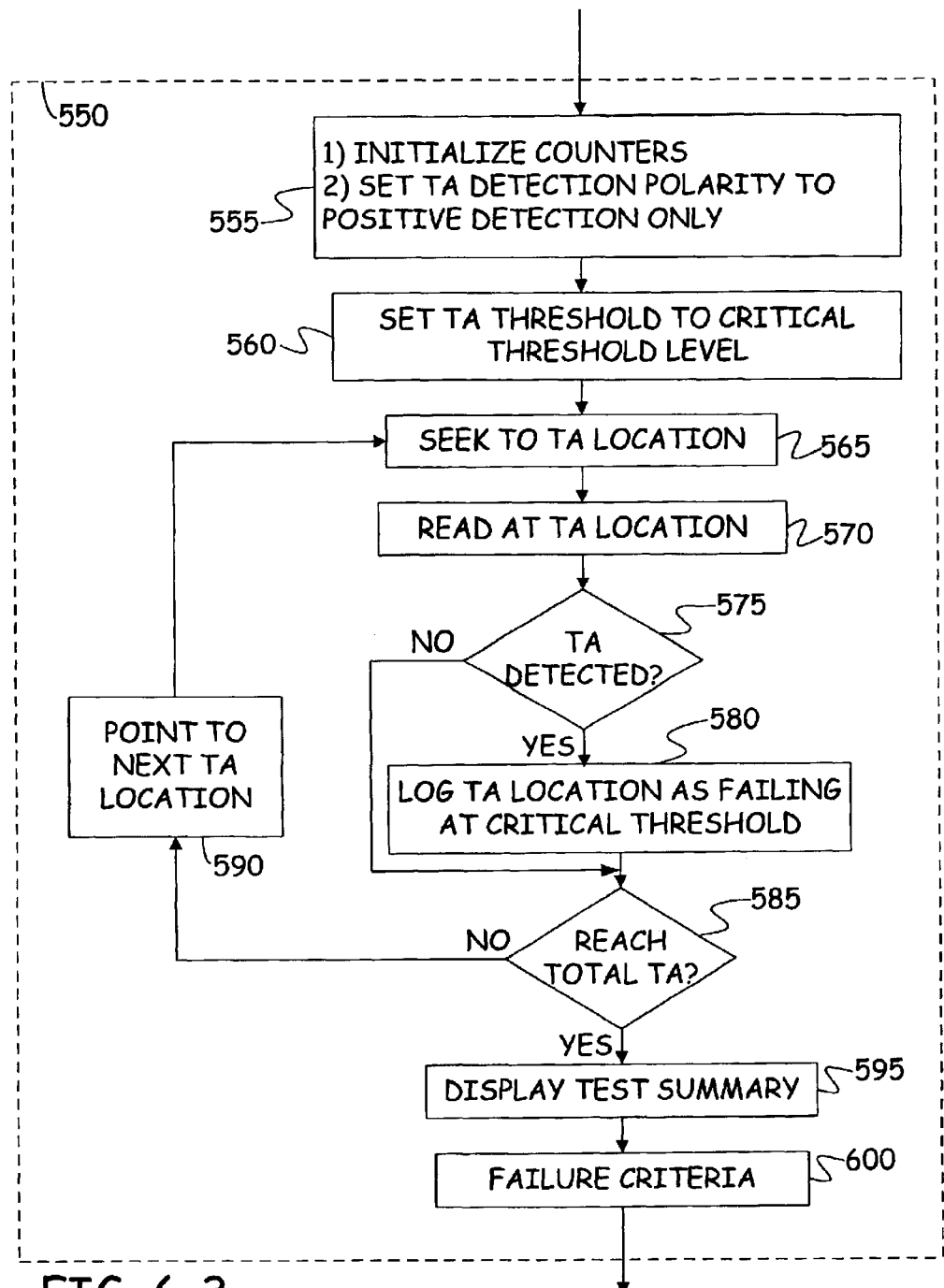

FIGS. 6-1 through 6-3 are flow diagrams illustrating more particular embodiments of the thermal asperity categorization method shown more generally in FIG. 5. Referring first to FIG. 6-1, at block 502 the more particular method begins with logging thermal asperity (TA) locations identified during a defect scan. Then, at step 504, a determination is made as to whether any thermal asperities have been logged that require analysis. If no thermal asperities require analysis, then the method comes to an end. If logged thermal asperities do exist which require analysis, a determination is made at step 506 whether to apply the multi-threshold loop 300 shown in FIG. 3, or whether to apply the single-threshold loop 400 shown in FIG. 4. As discussed above, the multi-threshold loop can be used in early manufacturing stages to categorize all of the thermal asperities on the storage media, while the single-threshold loop can be used later in the manufacturing process to fail data storage systems having defects or asperities which cause thermal asperities larger than the critical threshold.

If it is determined in step 506 that the multi-threshold loop should be applied, the method proceeds to step 508. In step 508, counters are initialized and thermal asperity detection polarity is set to detect only positive thermal asperities. Negative thermal asperities, which result from a cooling of the MR element due to airflow or pressure changes as the MR head passes over dips or indentations on the media surface, are not characterized using this method. Next, at step 510, the thermal asperity threshold is set to its minimum value. This is done, for example, by controlling variable threshold generator 315 to output the lowest possible threshold signal 317 (FIG. 3).

With the variable threshold set to its minimum value, at step 512 the MR head and associated actuator and servo components seek to the location of the currently at issue thermal asperity, and at step 514 the MR head reads from that location. If a comparison to the threshold signal indicates at step 516 that no threshold has been detected, at step 522 the thermal asperity location is logged as failing at the previous failed thermal asperity threshold. In the event that this failure occurs on the first pass through, this means that the thermal asperity is less than the minimum threshold in magnitude, and it is categorized accordingly.

If a comparison to the threshold signal indicates at step 516 that a thermal asperity has been detected, then a determination is made at step 518 as to whether the variable threshold signal is at its maximum value. If the variable threshold signal is not at its maximum value, then at step 520 the threshold is increased one increment, and the actions and analysis of steps 514, 516 and 518 are repeated. This loop continues until at step 516 the thermal asperity is no longer detected. At whatever point the thermal asperity is no longer detected, the thermal asperity location is logged as failing at the previous thermal asperity threshold. Since the threshold has been incremented, this provides an indication of the magnitude of the thermal asperity, and it is categorized accordingly at step 522. In the event that at step 518 a thermal asperity is determined to have been detected with the threshold at its maximum value, at step 524 the thermal asperity location is logged or categorized as having failed at the maximum threshold.

After each location has its thermal asperity logged or categorized in steps 522 or 524, a determination is made at step 526 as to whether other thermal asperity location have been logged, but their thermal asperities not logged or categorized. If the total number of logged thermal asperity locations has not been processed, at step 528 the next thermal asperity location is loaded, and steps 510, 512, 514, 516, 518, 520, 522, 524 and 526 repeat as necessary. If it is determined at step 526 that all logged thermal asperity locations have been categorized, then at step 528 the test summary can be displayed along with the failure criteria at step 530.

Referring to step 506 of FIG. 6-1, if it is determined that the single-threshold loop should be used, the method proceeds to single-threshold loop steps 550 shown in FIG. 6-3. In threshold loop steps 550, at step 555 counters are initialized and thermal asperity detection polarity is set to detect only positive thermal asperities, as was the case in step 508 discussed above. At step 560 the thermal asperity threshold is set to the critical threshold level, corresponding to a cutoff defect height or size above which the data storage system will be failed. At steps 565 and 570, the MR head and associated actuator and servo components seek to the location of the currently at issue thermal asperity, and the MR head reads from that location. If a comparison to the critical threshold signal indicates at step 575 that a thermal asperity has been detected at that location, the thermal asperity location is logged as having failed at the critical threshold.

If at step 575 it is determined that no thermal asperity has been detected, or if at step 580 a thermal asperity location has been logged as failing at the critical threshold, at step 585 a determination is made as to whether other thermal asperity locations have been logged, but their thermal asperities not checked for failure at the critical threshold level. If the total number of logged thermal asperity locations has not been processed, at step 590 the next thermal asperity location is loaded, and steps 565, 570, 575, 580, 585 and 590 repeat as necessary. If it is determined at step 585 that all logged thermal asperity locations have been checked for failure at the critical threshold level, then at step 595 the test summary can be displayed along with the failure criteria at step 600.

As discussed, the multi-loop threshold steps can be used to categorize thermal asperities according to a set of predetermined thresholds. Fallout samples per threshold can be sent for analysis to determine their defect height if more precise information is needed. Then, the critical threshold level can be selected based upon the cutoff defect height which will be allowed without failing the data storage system. This provides a method of screening out drives with large thermal asperities without subjecting the MR head to damage caused by over-dwelling over the large protruding defects.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive, while maintaining substantially the same functionality without departing from the scope and spirit of the present invention.

What is claimed is:

1. A method of categorizing magnitudes of thermal asperities in a read-back signal of a data storage system, the method comprising:

receiving the read-back signal from a location containing a thermal asperity;

generating a peak magnitude signal from the read-back signal;

generating a threshold signal using a variable threshold generator;

comparing the peak magnitude signal to the threshold signal; and categorizing a magnitude of the thermal asperity as a function of the comparison.

2. The method of claim 1, wherein generating the threshold signal comprises initially setting the threshold signal to a minimum threshold signal value, and wherein comparing the peak magnitude signal to the threshold signal further comprises determining whether the thermal asperity was detected, with the threshold signal set to the minimum threshold signal value, as a function of the comparison.

3. The method of claim 2, and if it is determined that the thermal asperity was detected with the threshold signal set to the minimum threshold signal value, then further comprising:

increasing the threshold signal to a next threshold signal value; and determining whether the thermal asperity was detected with the threshold signal set to the next threshold value.

4. The method of claim 3, wherein determining whether the thermal asperity was detected with the threshold signal set to the next threshold value further comprises:

re-reading at the thermal asperity location to obtain a new read-back signal containing the thermal asperity;

generating a peak magnitude signal from the new read-back signal;

generating the threshold signal at the next threshold value using the variable threshold generator;

comparing the peak magnitude signal to the threshold signal; and determining whether the thermal asperity was detected with the threshold signal set to the next threshold value as a function of the comparison.

5. The method of claim 4, and further comprising repeating the steps of claims 3 and 4 until it is determined that the thermal asperity was not detected, and then categorizing the magnitude of the thermal asperity as a function of a current threshold value of the threshold signal.

6. The method of claim 2, and if it is determined that the thermal asperity was not detected with the threshold signal set to the minimum threshold signal value, then further comprising categorizing the magnitude of the thermal asperity as a function of the minimum threshold signal value.

7. The method of claim 1, wherein generating the threshold signal comprises setting the threshold signal to a critical threshold value, and wherein comparing the peak magnitude signal to the threshold signal further comprises determining whether the thermal asperity was detected, with the threshold signal set to the critical threshold signal value, as a function of the comparison.

8. The method of claim 7, wherein categorizing the magnitude of the thermal asperity as a function of the comparison further comprises failing the data storage system if it is determined that the thermal asperity was detected with the threshold signal set to the critical threshold signal value.

9. A thermal asperity categorization circuit comprising:

a variable threshold generator which generates a threshold signal;

a comparator coupled to the variable threshold generator which compares the threshold signal to a peak magnitude signal indicative of a peak magnitude of a read-back signal containing a thermal asperity; and processing circuitry coupled to the comparator and configured to categorize a magnitude of the thermal asperity as a function of the comparison and as a function of a value of the threshold signal.

10. The thermal asperity categorization circuit of claim 9, and further comprising a peak detector coupled to the comparator and receiving the read-back signal as an input, the peak detector providing the peak magnitude signal indicative of the peak magnitude of the read-back signal and indicative of a baseline amplitude of the read-back signal.

11. The thermal asperity categorization circuit of claim 10, wherein the peak detector comprises a low pass filter.

12. The thermal asperity categorization circuit of claim 10, and further comprising a zero crossing detector receiving the read-back signal as an input and providing in response a zero crossing detection output.

13. The thermal asperity categorization circuit of claim 12, and further comprising an OR gate receiving as inputs the zero crossing detection output and an output of the comparator, the OR gate responsively providing an output to the processing circuitry.

14. A data storage system including the thermal asperity categorization circuit of claim 10.

15. A thermal asperity categorization circuit comprising:

a comparator which compares a threshold signal to a peak magnitude signal indicative of a peak magnitude of a read-back signal containing a thermal asperity; and means for generating the threshold signal such that it has variable values and for categorizing a magnitude of the thermal asperity as a function of a comparator output and as a function of a value of the threshold signal.

16. The thermal asperity categorization circuit of claim 15, wherein the means for generating the threshold signal such that it has variable values and for categorizing the magnitude of the thermal asperity further comprises a variable threshold generator.

17. The thermal asperity categorization circuit of claim 16, wherein the means for generating the threshold signal such that it has variable values and for categorizing the magnitude of the thermal asperity further comprises processing circuitry configured to control the variable threshold generator and to categorize the magnitude of the thermal asperity as a function of the comparator output and as a function of the value of the threshold signal.

* * * * *